Jan. 7, 1969   K. EAMES   3,420,056
FUEL CONTROL SYSTEM FOR A GAS TURBINE ENGINE
Filed Feb. 17, 1967

Inventor
Keith Eames
By
Cushman, Darby & Cushman
Attorneys

United States Patent Office 3,420,056
Patented Jan. 7, 1969

3,420,056
FUEL CONTROL SYSTEM FOR A GAS
TURBINE ENGINE
Keith Eames, Allestree, Derby, England, assignor to Rolls-Royce Limited, Derby, England, a British company
Filed Feb. 17, 1967, Ser. No. 616,872
Claims priority, application Great Britain, Feb. 23, 1966, 7,874/66
U.S. Cl. 60—39.28        8 Claims
Int. Cl. F02g 3/00; F02c 9/08

ABSTRACT OF THE DISCLOSURE

A fuel control system for an aircraft gas turbine engine, in which a computer receives as inputs data relating to the ambient conditions to which the engine is subjected, and uses the data to calculate a value of an engine operating parameter, e.g., jet pipe total pressure, necessary to achieve a minimum value of engine thrust consistent with a mode of operation of the engine such as take-off, normal climb or normal cruise.

---

This invention relates to a fuel control system for a gas turbine engine.

According to the present invention there is provided a fuel control system for a gas turbine engine wherein computing means having a plurality of selectable modes of operation each corresponding to a selectable mode of operation of the engine and connected to receive at least one input signal which is functionally dependent upon a parameter related to the ambient conditions to which the engine is subjected, is adapted to calculate from the value of said at least one input signal a required value of an engine operating parameter and to provide a first output signal which is functionally dependent thereupon, said required value being that necessary to achieve the selected mode of operation of the engine.

Preferably the fuel control system is provided with sensing means adapted to provide a second output signal which is functionally dependent upon a measured value of the engine operating parameter and indicating means connected to receive said first and second output signals and adapted to indicate either the measured value and the required value of the engine operating parameter or the difference therebetween.

Alternatively, the fuel control system may be provided with signal comparison means connected to receive said first and second output signals and adapted to provide a control signal which is functionally dependent upon the difference between the measured value and the required value of the engine operating parameter.

The engine operating parameter may be the engine jet pipe total pressure or it may be the engine pressure ratio.

Figure 1:
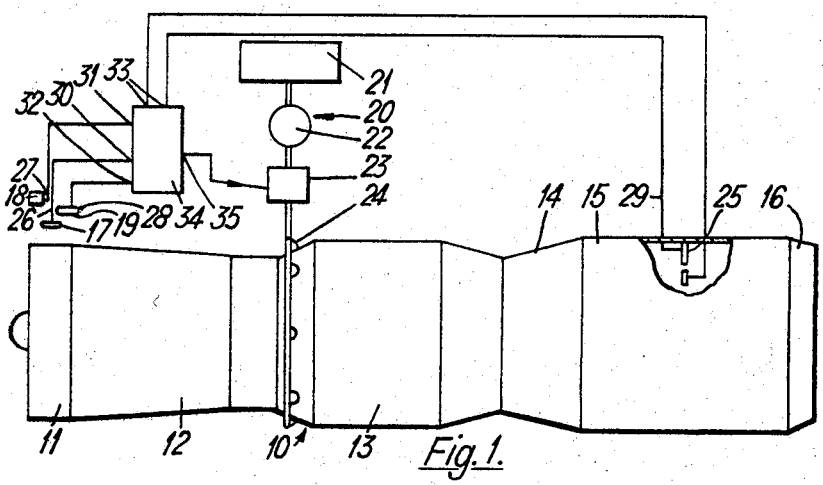
Figure 2:
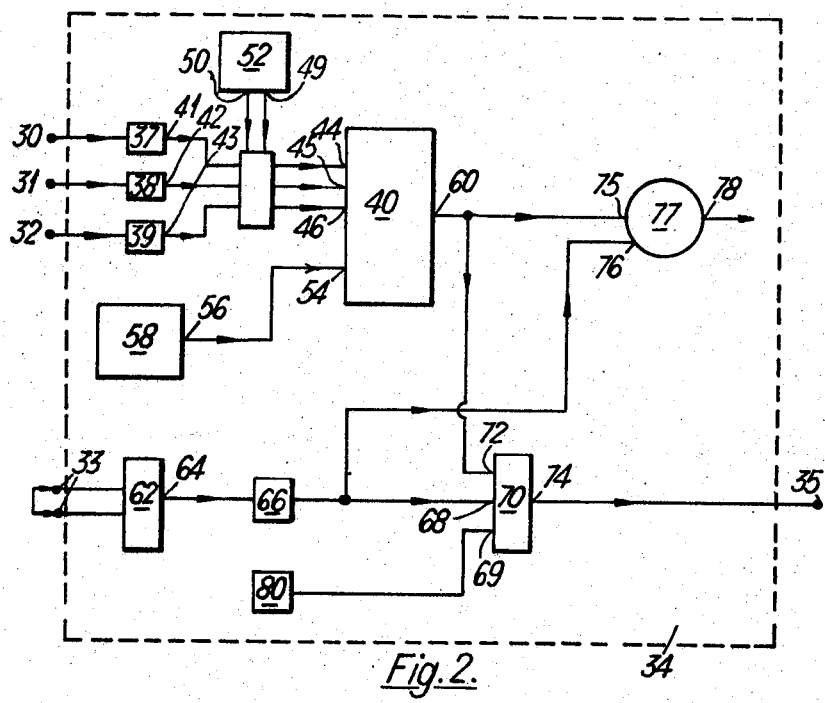

The invention is illustrated, merely by way of example, in the accompanying drawings, in which:

FIGURE 1 is a diagrammatic broken-away view of a gas turbine engine fitted with a fuel control system in accordance with the present invention; and FIGURE 2 is a diagrammatic representation of the fuel control system shown in FIGURE 1.

In FIGURE 1 is shown a gas turbine engine 10 mounted in an aircraft (not shown) and having, in flow series, an intake 11, a compressor 12, combustion means 13, a turbine 14 drivingly connected to the compressor 12, a jet pipe 15 and an exhaust nozzle 16. Mounted on the aircraft are measuring devices 17, 18 and 19, the output signals of which are respectively dependent upon the total temperature and pressure of the air in which the aircraft is operating and to the Mach number of the aircraft.

The gas turbine engine 10 is provided with a fuel supply system, generally indicated at 20, comprising a fuel tank 21, a pump 22 and a fuel control unit 23 supplying fuel to a manifold 24 and thence to the combustion means 13.

Mounted in the jet pipe 15 are further measuring devices 25, at outputs 29 of which are signals dependent upon jet pipe total pressure. Outputs 26, 27, 28 and 29 of measuring devices 17, 18, 19 and 25 respectively are connected to inputs 30, 31, 32 and 33 respectively of a fuel control system 34. An output 35 of the fuel control system 34 is connected to a servomechanism (not shown) in the fuel control unit 23.

The inputs 30, 31 and 32 of the fuel control system 34 (FIGURE 2) are connected to transducers 37, 38 and 39 respectively which convert the input signals to a form suitable for use in a computer 40. At and above a predetermined aircraft speed, for example, 50 knots, or when the aircraft has completed the take-off phase, the outputs 41, 42 and 43 of the transducers 37, 38 and 39 are connected to the inputs 44, 45 and 46 respectively of the computer 40 through a change-over device 48. At low aircraft speeds, however, the change-over device 48 operates to connect the inputs 44 and 45 of the computer 40 to the outputs 49, 50 of a manually operated signal source 52, leaving the input 46 of the computer 40 connected to the output 43 of the transducer 39. At low speeds, therefore, signals proportional to outside air temperature and pressure may be set up manually on the signal source 52, thereby obviating the errors inherent in the measuring devices 17 and 18 at low aircraft speeds. In practice, correct values of outside air temperature and pressure might be obtained from a control tower by the pilot of the aircraft while preparing for take-off: as soon as the aircraft speed exceeds 50 knots, or preferably when the take-off phase is completed, the change-over device 48 operates to cause reversion to the aircraft mounted measuring devices 17 and 18.

Connected to an input 54 of the computer 40 is an output 56 from an engine rating selector 58, which selects the mode in which the engine 10 is to operate. The pilot may set the selector 58 to such settings as "take-off," "normal cruise" or "normal climb" and he may also set it to indicate other factors such as the degree of anti-icing required. The computer 40 then uses stored data relating to the variation of jet pipe total pressure with ambient air parameters at one of several engine ratings to compute the minimum jet pipe total pressure for the engine 10 consistent with the selected mode of operation of the engine and the conditions under which the engine is operating. An output 60 of the computer 40 provides a signal proportional to the required jet pipe total pressure.

The inputs 33 of the fuel control system 34 are connected to a device 62, at output 64 of which is a signal proportional to the average value of the jet pipe total pressure. The output 64 of device 62 is connected through a transducer 66, which converts the signal to a form suitable for use in the computer 40, to an input 68 of pressure balancing means 70. To another input 72 of the pressure balancing means 70 is connected the output 60 of the computer 40. The pressure balancing means 70 provides an "error" or "out of balance" signal at its output 74 proportional to the difference in the signals at its inputs 68, 72. The output 74 of the pressure balancing means 70 is connected to the output 35 of the fuel control system 34.

Once the pilot of the aircraft has selected the mode of operation of the gas turbine engine 10, the computer 40 computes the jet pipe total pressure consistent with this mode of operation and the ambient conditions under which the engine is operating, the pressure balancing means 70 compares the computed and measured jet pipe total pressures, and the resulting error signal is used to vary the fuel flow to the gas turbine engine to produce a null (or zero error signal) at the output 74 of the pressure balancing means 70.

Thus, at a given engine rating, the thrust produced by the engine is maintained at a constant minimum value consistent with the rating regardless of changes in the ambient conditions to which the engine is exposed. This greatly increases engine life.

The output 69 of the computer 40 and output 78 of the transducer 66 are connected to inputs 75, 76 respectively of a gauge 77 which gives the pilot of the aircraft an indication of the difference between the computed and measured jet pipe total pressures. The gauge 77 may be calibrated, using the unique relationship between jet pipe total pressure and engine gross thrust, to indicate the ratio of measured engine gross thrust to computed engine gross thrust as a percentage. An output 78 from the gauge 77 may, if desired, be connected to an automatic data recorder (not shown).

If it is required, under certain conditions, to operate the gas turbine engine 10 under the control of engine parameters other than jet pipe total pressure, the operation of the balancing means 70 may be cancelled by means of the cancelling device 80 connected to an input 19. The computer 40 and the gauge 77, however, remain operable so that the pilot still receives useful information relating to jet pipe total pressure and engine gross thrust in a convenient form.

The gas turbine engine 10 is provided with engine controls (not shown) such as shaft speed governors, turbine gas temperature controller and compressor delivery pressure limiter, operating on the fuel control unit 23. The operation of all these controllers overrides the operation of the fuel control system 34. If the operation of the fuel control system 34 is overridden at take-off, for example, the pilot receives an indication on the gauge 77 of the difference between the necessary and actual jet pipe total pressures, and can thus decide whether or not to abandon take-off.

It will be appreciated that the fuel control system 34 could easily be adapted to suit a multi-engined aircraft. In this case the fuel control system 34 may be provided with a "contingency rating" selector (not shown). The "contingency rating" selector receives as inputs signals proportional to the jet pipe total pressure of each engine: in the event of an engine failure, the "contingency rating" selector cancels the operation of all the pressure balancing means such as 70 so that all other engines can run to the limits of their normal engine controllers.

Although the fuel control system described in the specification uses jet pipe pressure as the control parameter, it will be appreciated that it may be more convenient to use engine pressure ratio, which is the ratio of jet pipe total pressure to engine intake total pressure, as the control parameter. This will merely necessitate minor modifications in the pressure measuring systems 25 and 62, and different data will be stored in the computer.

I claim:

1. A fuel control system for a gas turbine engine, comprising first sensing means for providing at least one signal which is functionally dependent upon a parameter related to the ambient conditions to which the engine is subjected and computing means connected to receive said at least one signal, wherein said computing means has at least one mode of operation corresponding to a selectable mode of operation of the engine, said computing means having means to calculate from the value of said at least one signal a required value of an engine operating parameter selected from the group consisting of jet pipe total pressure and engine pressure ratio, and having means to provide a first output signal which is functionally dependent thereupon, said required value being that necessary to achieve the selected mode of operation of the engine.

2. A fuel control system as claimed in claim 1, comprising second sensing means for providing a second output signal which is functionally dependent upon a measured value of the engine operating parameter and indicating means connected to receive said first and second output signals and arranged to indicate the measured value and the required value of the engine operating parameter.

3. A fuel control system as claimed in claim 1, comprising second sensing means for providing a second output signal which is functionally dependent upon a measured value of the engine operating parameter and signal comparison means connected to receive said first and second output signals and adapted to provide a control signal which is functionally dependent upon the difference between the measured value and the required value of the engine operating parameter.

4. A fuel control system as claimed in claim 3 comprising a servomechanism connected to receive said control signal and adapted to adjust the flow of fuel to the engine in response to said control signal so as to cause the engine operating parameter to change in such a manner that the measured value and the required value of the engine operating parameter tend to become equal.

5. A gas turbine engine provided with a fuel control system as claimed in claim 1.

6. An aircraft provided with a gas turbine engine as claimed in claim 5.

7. An aircraft as claimed in claim 6, wherein said first sensing means comprises three sensing devices each adapted to produce a signal, said signals being respectively functionally dependent upon ambient air temperature, ambient air pressure and the Mach number of the aircraft.

8. A fuel control system as claimed in claim 1, wherein said computing means has a plurality of selectable modes of operation each corresponding to a selectable mode of operation of the engine.

References Cited

UNITED STATES PATENTS

| | | | |
|---|---|---|---|
| 2,851,855 | 9/1958 | Gamble | 60—39.28 |
| 2,971,337 | 2/1961 | Wintrode | 60—39.28 |
| 2,971,338 | 2/1961 | Bodemuller | 60—39.28 |

JULIUS E. WEST, *Primary Examiner.*